US012629709B2

(12) United States Patent
Schmidt et al.

(10) Patent No.: US 12,629,709 B2
(45) Date of Patent: May 19, 2026

(54) TRIGGER PUMP DISPENSER

(71) Applicant: OBRIST CLOSURES SWITZERLAND GMBH, Reinach (CH)

(72) Inventors: Patrick Schmidt, Zell-Kaimt (DE); Christian Wilhelms, Blankenrath (DE); Klaus Natersky, Grenderich (DE)

(73) Assignee: OBRIST CLOSURES SWITZERLAND GMBH, Reinach (CH)

( * ) Notice: Subject to any disclaimer, the term of this patent is extended or adjusted under 35 U.S.C. 154(b) by 299 days.

(21) Appl. No.: 18/018,348

(22) PCT Filed: Jul. 31, 2021

(86) PCT No.: PCT/EP2021/071510
§ 371 (c)(1),
(2) Date: Jan. 27, 2023

(87) PCT Pub. No.: WO2022/023579
PCT Pub. Date: Feb. 3, 2022

(65) Prior Publication Data

US 2023/0271209 A1 Aug. 31, 2023

(30) Foreign Application Priority Data

Jul. 31, 2020 (GB) ..................................... 2011946

(51) Int. Cl.
*B05B 11/10* (2023.01)

(52) U.S. Cl.
CPC ........ *B05B 11/1057* (2023.01); *B05B 11/104* (2023.01)

(58) Field of Classification Search
CPC ............... B05B 11/1057; B05B 11/104; B05B 11/1074; B05B 11/1077; B05B 11/1064; B05B 11/1011; B05B 11/0008
See application file for complete search history.

(56) References Cited

U.S. PATENT DOCUMENTS 4,191,313 A * 3/1980 Blake .................. B05B 11/1011 222/335
5,114,049 A * 5/1992 Knickerbocker ... B05B 11/1059 222/384

(Continued)

FOREIGN PATENT DOCUMENTS

CA 2204374 5/1996
JP H0831912 A 5/1996

(Continued)

OTHER PUBLICATIONS

International Search Report and Written Opinion for PCT/EP2021/071510 dated Nov. 12, 2021.

(Continued)

*Primary Examiner* — Bob Zadeh
(74) *Attorney, Agent, or Firm* — Barnes & Thornburg LLP

(57) ABSTRACT

A trigger pump dispenser (10) comprising: a body (20); an outlet nozzle (35); a pump chamber (190); a piston (25) for defining a variable volume in the pump chamber (190) and movable between a retracted position of larger chamber volume and an inserted position of lesser chamber volume; a trigger (60) coupled with the piston (25) and movable from a starting position at which the piston (25) is in the retracted position and a depressed position at which the piston (25) is in the inserted position; biasing means (65*a*, 65*b*) is provided for biasing the trigger (60) towards its retracted position.

20 Claims, 20 Drawing Sheets

(56) References Cited

U.S. PATENT DOCUMENTS

| | | | | | |
|---|---|---|---|---|---|
| 5,228,602 | A * | 7/1993 | Maas | B05B 11/1011 | 222/340 |
| 5,467,900 | A * | 11/1995 | Maas | F41B 9/0053 | 222/341 |
| 5,730,335 | A * | 3/1998 | Maas | F41B 9/0053 | 222/341 |
| 2006/0054642 | A1* | 3/2006 | Buti | B05B 11/1074 | 222/383.1 |
| 2007/0295757 | A1* | 12/2007 | Foster | B05B 11/1011 | 222/340 |
| 2008/0230563 | A1* | 9/2008 | Maas | B05B 11/1069 | 222/383.1 |
| 2012/0261438 | A1* | 10/2012 | Dejong | B05B 11/1069 | 222/383.1 |
| 2013/0020355 | A1* | 1/2013 | Alluigi | B05B 11/1011 | 222/383.1 |
| 2013/0341362 | A1* | 12/2013 | Hoffmann | B05B 11/0032 | 222/340 |
| 2014/0319244 | A1* | 10/2014 | Rech | B05B 11/0075 | 239/337 |
| 2015/0336123 | A1* | 11/2015 | Hoffmann | B05B 11/1011 | 222/380 |
| 2023/0271209 | A1* | 8/2023 | Schmidt | B05B 11/104 | 222/401 |

FOREIGN PATENT DOCUMENTS

| | | | | |
|---|---|---|---|---|
| JP | H09314000 A | 12/1997 | | |
| JP | H1043647 | 2/1998 | | |
| WO | 2004065021 | 8/2004 | | |
| WO | WO-2012110861 A1 * | 8/2012 | | B05B 11/1045 |
| WO | WO-2012172276 A1 * | 12/2012 | | B05B 11/1059 |

OTHER PUBLICATIONS

Japanese Office Action for counterpart Japanese App. No. JP2023506181 received (Jul. 14, 2025), English translation included, 23 pages.

* cited by examiner

0%

50%

100%

TRIGGER PUMP DISPENSER

CROSS REFERENCE TO RELATED APPLICATIONS

This application is a U.S. national stage application under 35 U.S.C. § 371(b) of International Application No. PCT/EP2021/071510 filed Jul. 31, 2021, which claims priority to the United Kingdom Patent Application No. GB2011946.7 filed on Jul. 31, 2020, the disclosures of both of which are hereby expressly incorporated by reference in their entirety.

The present invention relates generally to dispensers for liquid products and particularly to so-called "trigger pumps" of the kind which have a trigger operable to drive a piston along a pump chamber against the action of a spring and so to force liquid product under pressure from the pump chamber and through a dispensing orifice in an nozzle.

Some aspects and embodiments of the present invention relate generally to a valve and particularly, although not exclusively, to a valve for a pump, such as a valve for a trigger pump or the like.

An aspect of the present invention provides a trigger pump dispenser comprising: a body; an outlet nozzle; a pump chamber; a piston for defining a variable volume in the pump chamber and movable between a retracted position of larger chamber volume and an inserted position of lesser chamber volume; a trigger coupled with the piston and movable from a starting position at which the piston is in the retracted position and a depressed position at which the piston is in the inserted position; biasing means for biasing the trigger towards its retracted position, the pump comprises an inlet port and an outlet port defined by the body and adapted to be in communication with the pump chamber, the pump comprises an inlet valve adapted to close the inlet port when liquid to be dispensed is in the pump chamber and the piston is moved from the retracted position to the inserted position as the pump chamber decreases in volume, the inlet valve is adapted to open the inlet port when liquid to be dispensed is drawn into the pump chamber through the inlet port as the pump chamber volume increases when the piston is moved from the inserted position to the retracted position, the outlet valve is adapted to open the outlet port when the pump chamber decreases in volume as liquid therein is dispensed through the outlet port and adapted to close when the pump chamber increases in volume, the outlet valve comprises a precompression valve operable to allow liquid through the outlet only after a predetermined elevated pressure is established in the pump chamber.

An aspect of the present invention provides a trigger pump dispenser comprising: a body; an outlet nozzle; a pump chamber; a piston for defining a variable volume in the pump chamber and movable between a retracted position of larger chamber volume and an inserted position of lesser chamber volume; a trigger coupled with the piston and movable from a starting position at which the piston is in the retracted position and a depressed position at which the piston is in the inserted position; biasing means for biasing the trigger towards its retracted position, the pump comprises an inlet port and an outlet port defined by the body and adapted to be in communication with the pump chamber, the pump comprises an inlet valve adapted to close the inlet port when liquid to be dispensed is in the pump chamber and the piston is moved from the retracted position to the inserted position as the pump chamber decreases in volume, the inlet valve is adapted to open the inlet port when liquid to be dispensed is drawn into the pump chamber through the inlet port as the pump chamber volume increases when the piston is moved from the inserted position to the retracted position, the outlet valve is adapted to open the outlet port when the pump chamber decreases in volume as liquid therein is dispensed through the outlet port and adapted to close when the pump chamber increases in volume.

In some embodiments, during a suction stroke the piston is moved away from the valve, so that a vacuum builds up in the cylinder chamber and due to the negative pressure a lip of the inlet valve collapses and opens the inlet opening, the liquid can now enter the cylinder chamber via the inlet path, in which during the pressure stroke the piston moves in the direction of the valve and thus builds up excess pressure in the system, the sealing lip of the inlet valve is pressed against the outer wall of the cylinder and seals the inlet opening, and in which when a certain pressure level is exceeded, the outlet valve snaps backwards, which creates a free passage between the outer valve part and the inner valve part.

The predetermined elevated pressure may, for example, be defined by the material of the valve inner part. Alternatively or additionally the predetermined elevated pressure may, for example, be defined by the design of a conical connection between an outer jacket and an inner sealing element.

The dispenser may comprise a valve member, the valve member comprising a first part and a second part, the parts being formed separately and being connectable together, one of the parts provides an inlet valve function and the other of the parts provides an outlet function.

A gap may be created by the valve movement that enables the liquid to flow from the cylinder space into the outlet channel.

The valve opening distance may be determined by the length of a central stop.

In some embodiments, if the system pressure drops below a certain level, the outlet valve snaps back into its original position and seals the outer part of the valve so that the connection from the cylinder chamber to the outlet side is closed again.

The trigger and the biasing means may be formed in the same component.

The biasing means may comprises a pair of mutually spaced curved spring arms. The arms may be unconnected (other than via the trigger).

The arms may be joined to the trigger at hinge points, whereby the arms can hinge relative to the trigger in use. This can, for example, be used to provide a more powerful spring action.

The trigger and the spring arms may be formed together a single piece.

Components of the dispenser, such as the actuator may, for example, be formed from post-consumer recycled (PCR) plastic. For example the actuator may be formed from 20-80% PCR content.

A further aspect provides a valve element for providing a precompression function in a pumping cylinder of a trigger sprayer which only allows pressurised liquid to be expelled when the pressure of the liquid in the cylinder is above a certain predetermined level.

A further aspect provides a converter valve for converting non-pre-compression pumps to pre-compression.

A further aspect provides a trigger pump dispenser comprising: a body; an outlet nozzle; a pump chamber; a piston for defining a variable volume in the pump chamber and movable between a retracted position of larger chamber volume and an inserted position of lesser chamber volume; a trigger coupled with the piston and movable from a starting position at which the piston is in the retracted position and a depressed position at which the piston is in the inserted position; biasing means for biasing the trigger towards its retracted position, the pump comprises an inlet port and an outlet port defined by the body and adapted to be in communication with the pump chamber, the pump comprises an inlet valve adapted to close the inlet port when liquid to be dispensed is in the pump chamber and the piston is moved from the retracted position to the inserted position as the pump chamber decreases in volume, the inlet valve is adapted to open the inlet port when liquid to be dispensed is drawn into the pump chamber through the inlet port as the pump chamber volume increases when the piston is moved from the inserted position to the retracted position, the outlet valve is adapted to open the outlet port when the pump chamber decreases in volume as liquid therein is dispensed through the outlet port and adapted to close when the pump chamber increases in volume, the outlet valve comprises a precompression valve operable to allow liquid through the outlet only after a predetermined elevated pressure is established in the pump chamber, in which the trigger and the biasing means are formed in the same component, and in which the biasing means comprises a pair of mutually spaced curved spring arms.

A further aspect provides a trigger pump dispenser comprising: a body; an outlet; a pump chamber; a piston for defining a variable volume in the pump chamber and movable between a retracted position of larger chamber volume and an inserted position of lesser chamber volume; a trigger coupled with the piston and movable from a starting position at which the piston is in the retracted position and a depressed position at which the piston is in the inserted position; biasing means for biasing the trigger towards its retracted position, in which the trigger and the biasing means are formed in the same component, and in which the biasing means comprises a pair of mutually spaced curved spring arms.

A further aspect provides an actuator for a trigger pump dispenser comprising a trigger that is movable, in use, between a retracted position and a depressed position, and a spring for biasing the trigger towards a retracted position, in which the trigger and the biasing means are formed in the same component, and in which the spring comprises a pair of mutually spaced curved arms.

The arms may be substantially the same.

The arms may be generally J-shape or generally U-shape.

The arms may extend generally parallel to each other.

The spring arms may be generally straight along a vertical plane.

The spring arms may be curved in a horizontal plane.

The ends of the arms opposite the trigger may include a flat. The arms may be simple, continuous curves (other than the flat).

The ends of the arms opposite the trigger may include a hook or a wedge.

The arms may extend from the trigger at one end and at the other end they may be free i.e. supported/connected only at one end.

Each arm may be joined to the trigger at a hinge point, whereby the arms can hinge relative to the trigger in use.

The actuator may be formed (e.g. moulded) as a single piece e.g. from a plastics material.

The actuator may be formed from post-consumer recycled (PCR) plastic.

The actuator may be formed from PCR content in the range 20% to 80%.

The present invention also provides an actuator as described herein in comnivation with a trigger pump dispenser as described or defined herein.

The present invention also provides a trigger pump dispenser having an actuator as described or defined herein.

Some aspects and embodiments provide or relate to a pre-compression valve operable to allow liquid through an outlet only after a predetermined elevated pressure is established.

A pump outlet valve may be/comprise a precompression valve operable to allow liquid through the outlet only after a predetermined elevated pressure is established in a pump chamber Some embodiments provide a pre-compression valve which reduces the amount of body parts due to a compact design. Thereby, this valve can facilitate a lightweight trigger pump.

Some embodiments comprise an outer valve part and an inner valve part.

In some embodiments, during a suction stroke, a piston may be moved away from the valve so that a vacuum builds up in a cylinder chamber. Due to the negative pressure, a lip of an inlet valve may collapse and open an inlet opening. Liquid can now enter the cylinder chamber via an inlet path.

During a pressure stroke, a piston may move in the direction of the valve and thus builds up excess pressure in the system. The sealing lip of the inlet valve may be pressed against the outer wall of the cylinder and seals the inlet opening.

When a certain pressure level is exceeded, the outlet valve may snap backwards, which may create a free passage between the outer valve part and the inner valve part. The pressure level for switching may be defined by the material of the valve inner part and the design of the conical connection between the outer jacket and the inner sealing element. The opening distance may be determined by the length of a central stop bar.

The gap created by the valve movement may enable the liquid to flow from the cylinder space into the outlet channel.

If the system pressure drops below a certain level, the outlet valve may snap back into its original position and seals the outer part of the valve so that the connection from the cylinder chamber to the outlet side is closed again.

A trigger pump dispenser may comprise: a body; an outlet nozzle; a pump chamber; a piston for defining a variable volume in the pump chamber and movable between a retracted position of larger chamber volume and an inserted position of lesser chamber volume; a trigger coupled with the piston and movable from a starting position at which the piston is in the retracted position and a depressed position at which the piston is in the inserted position; biasing means for biasing the trigger towards its retracted position.

The pump may comprise an inlet port and an outlet port defined by the body and adapted to be in communication with the pump chamber.

The pump may comprise an inlet valve adapted to close the inlet port when liquid to be dispensed is in the pump chamber and the piston is moved from the retracted position to the inserted position as the pump chamber decreases in volume.

The inlet valve may be adapted to open the inlet port when liquid to be dispensed is drawn into the pump chamber through the inlet port as the pump chamber volume increases when the piston is moved from the inserted position to the retracted position.

The outlet valve may be adapted to open the outlet port when the pump chamber decreases in volume as liquid therein is dispensed through the outlet port and adapted to close when the pump chamber increases in volume, The outlet valve may comprise a precompression valve operable to allow liquid through the outlet only after a predetermined elevated pressure is established in the pump chamber.

This aspect of the invention therefore provides a precompression function in a pumping cylinder of a trigger sprayer which only allows pressurised liquid to be expelled when the pressure of the liquid in the cylinder is above a certain predetermined level.

The precompression system can be used to prevent fluid from being discharge at too low a pressure and allows for an improved spraying pattern as liquid can be pressed out of an outlet nozzle as a predetermined and relatively high pressure.

Functional description: example precompression valve.

During the suction stroke, the piston (here not shown) is moved away from the valve, so that a vacuum builds up in the cylinder chamber. Due to the negative pressure, the lip of the inlet valve collapses and opens the inlet opening.

The liquid can now enter the cylinder chamber via the inlet path.

During the pressure stroke, the piston moves in the direction of the valve and thus builds up excess pressure in the system. The sealing lip of the inlet valve is pressed against the outer wall of the cylinder and seals the inlet opening.

When a certain pressure level is exceeded, the outlet valve snaps backwards, which creates a free passage between the outer valve part and the inner valve part. The pressure level for switching is defined by the material of the valve inner part and the design of the conical connection between the outer jacket and the inner sealing element. The opening distance is determined by the length of the central stop bar.

The gap created by the valve movement enables the liquid to flow from the cylinder space into the outlet channel.

If the system pressure drops below a certain level, the outlet valve snaps back into its original position and seals the outer part of the valve so that the connection from the cylinder chamber to the outlet side is closed again.

One advantage of this valve concept is that it is an independent pre-compression valve element with which can, for example, be used to constructively convert existing non-pre-compression pumps to pre-compression.

The present invention also provides a trigger pump comprising a valve as described herein.

Different aspects and embodiments of the invention may be used separately or together.

Examples of the present invention are shown in the accompanying drawings. Brief descriptions of the drawings are provided below:

Figure 1:
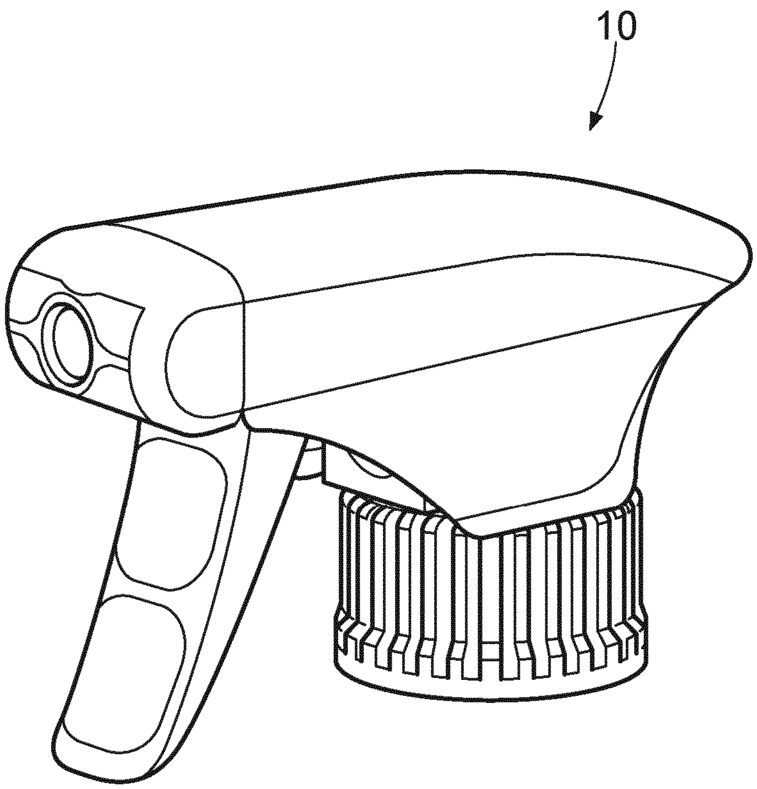
FIG. 1 is a perspective view of a trigger pump dispenser according to a first aspect of the present disclosure.
Figure 2:
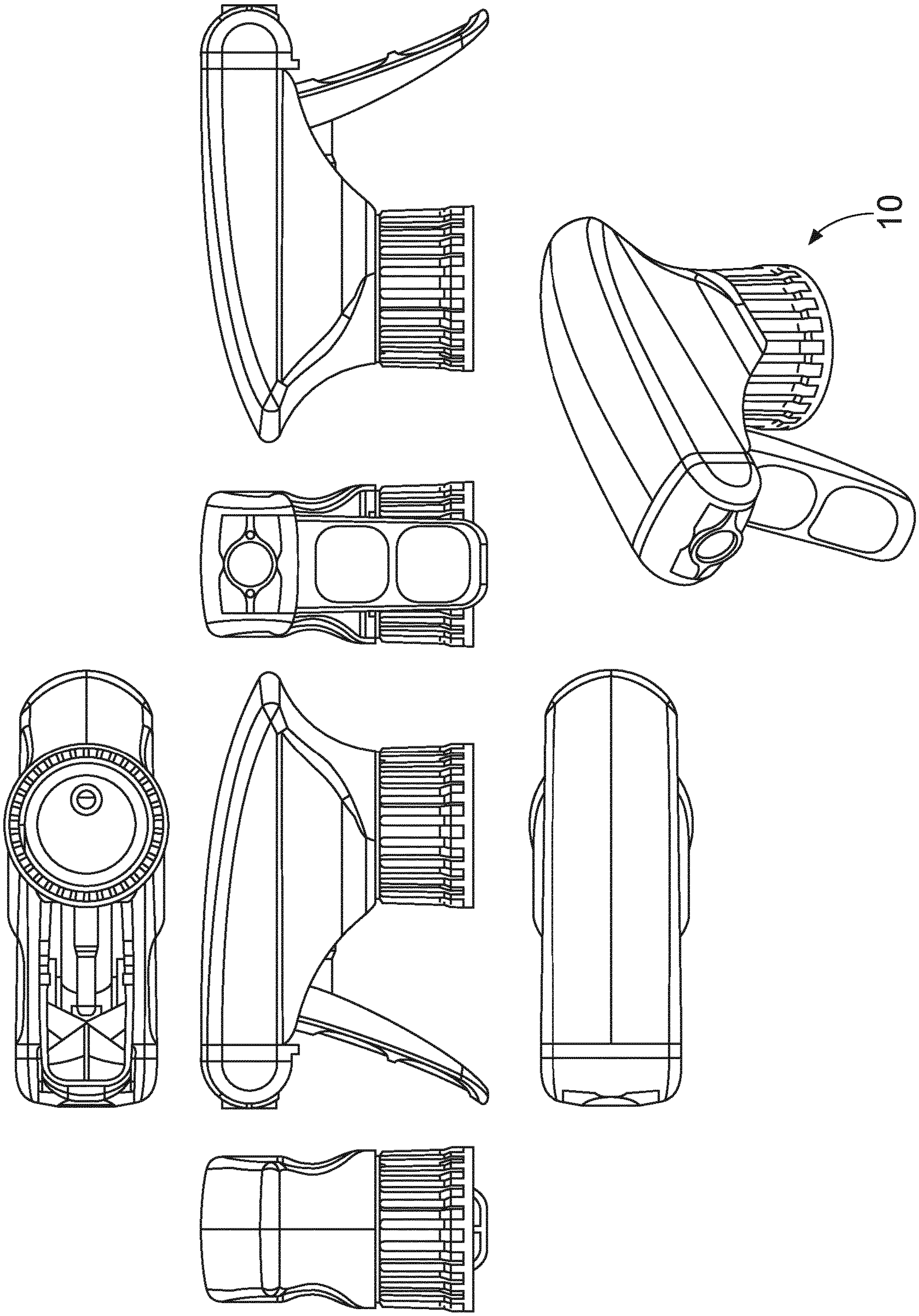
FIG. 2 shows various views of the trigger pump dispenser of FIG. 1.
Figure 3:
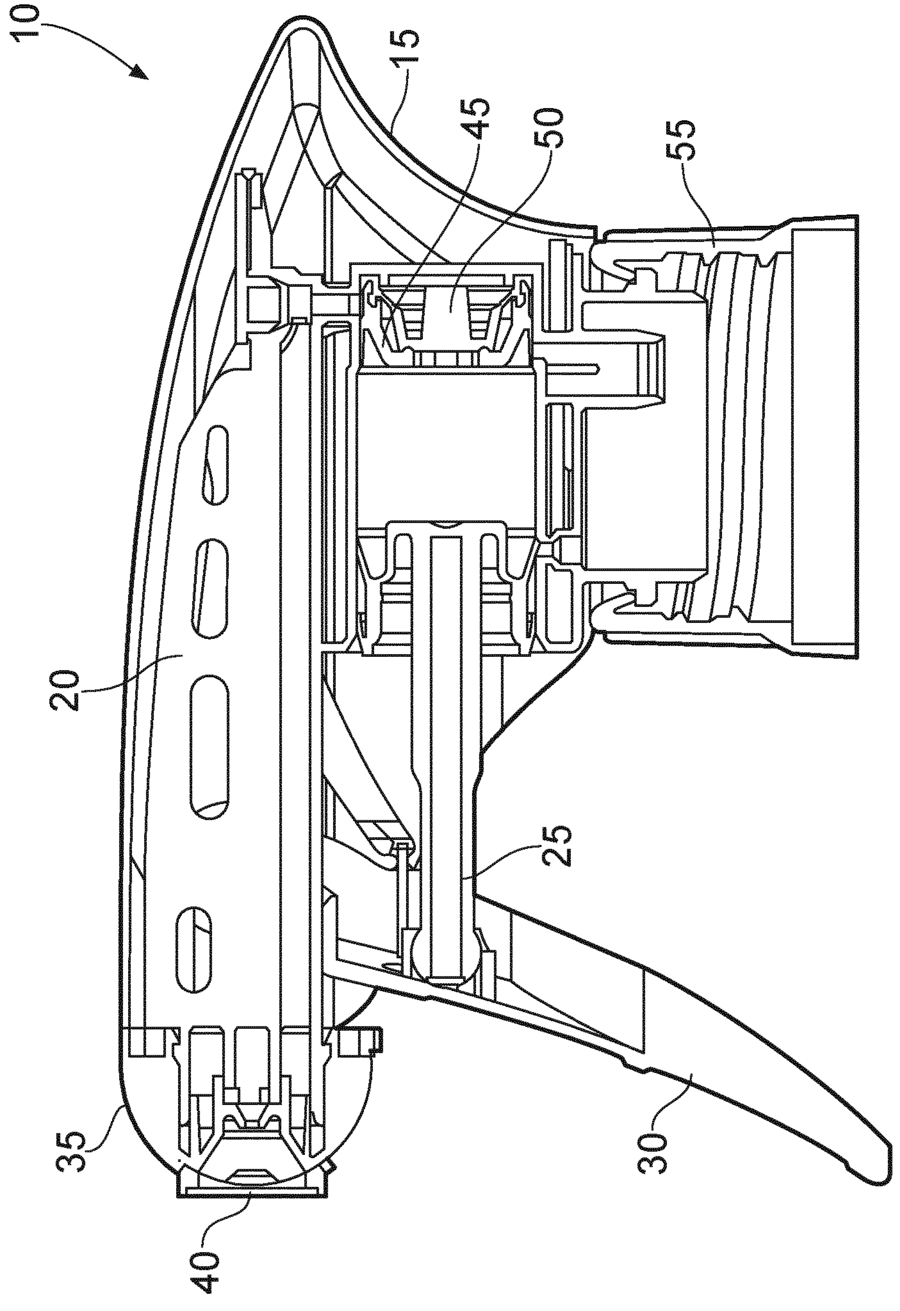
FIG. 3 is a side cross-sectional view of the trigger pump dispenser of FIG. 1.
Figure 14:
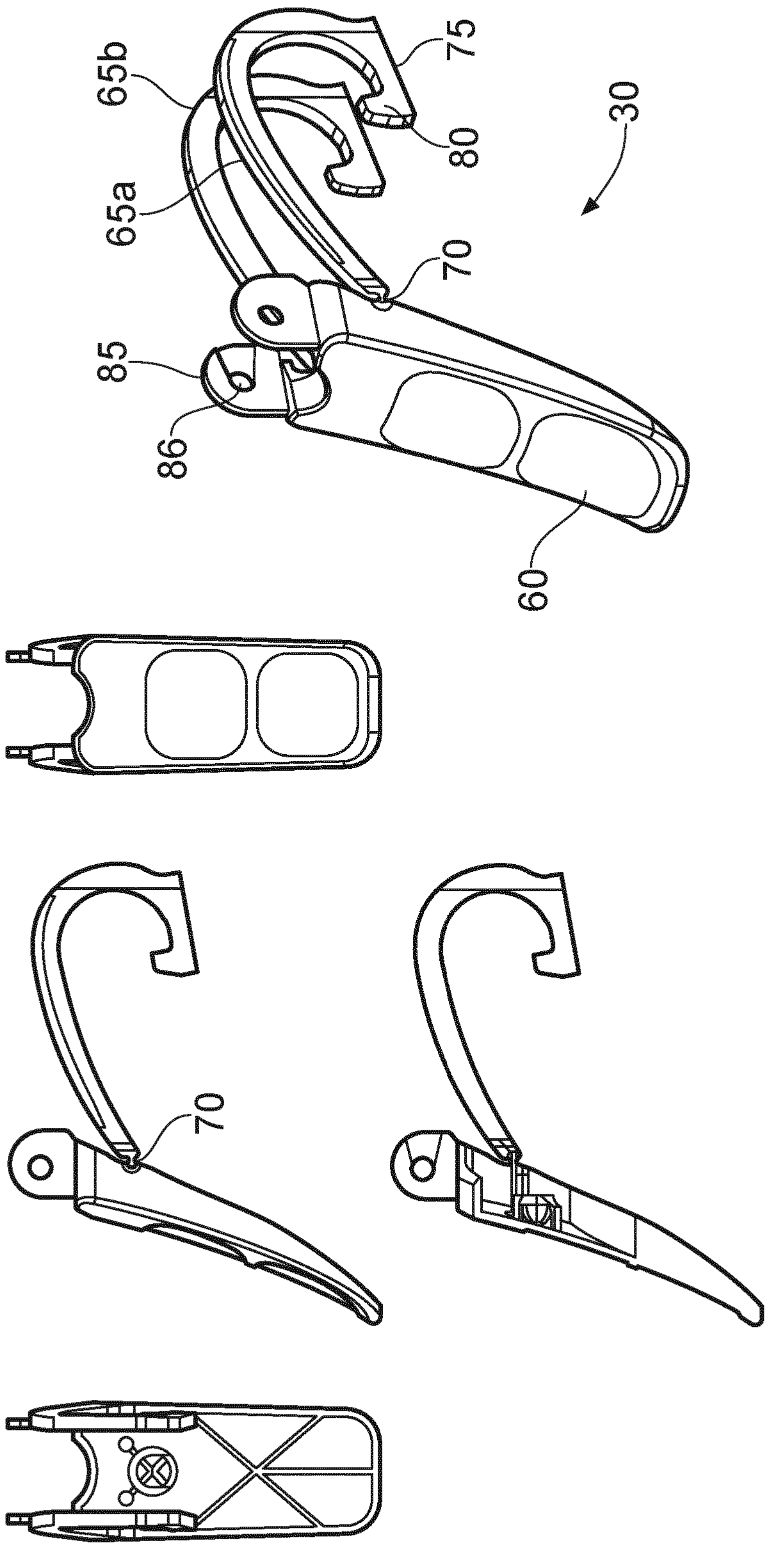
FIG. 14 shows various views of an actuator of the trigger pump dispenser of FIG. 1.
Figure 15A:
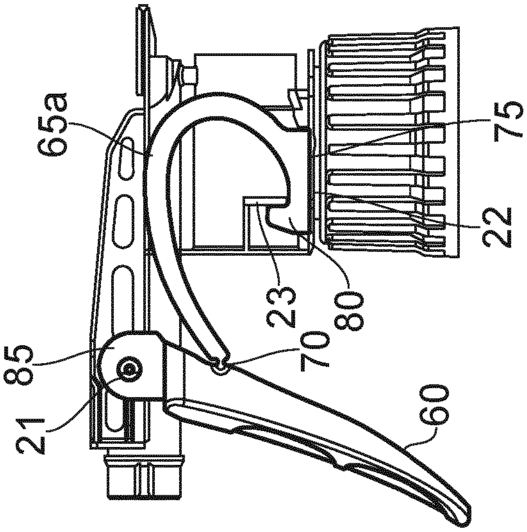
Figure 15B:
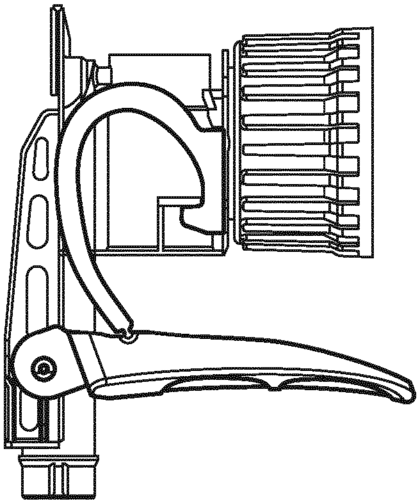
Figure 15C:
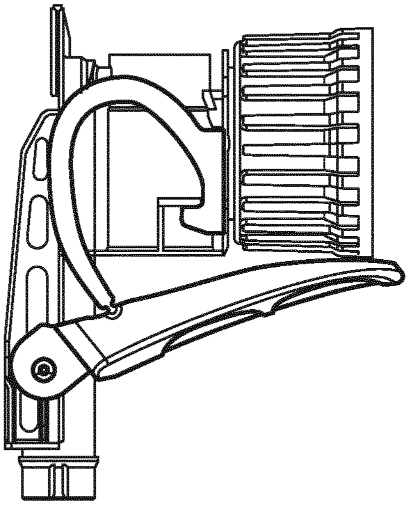
Figure 16:
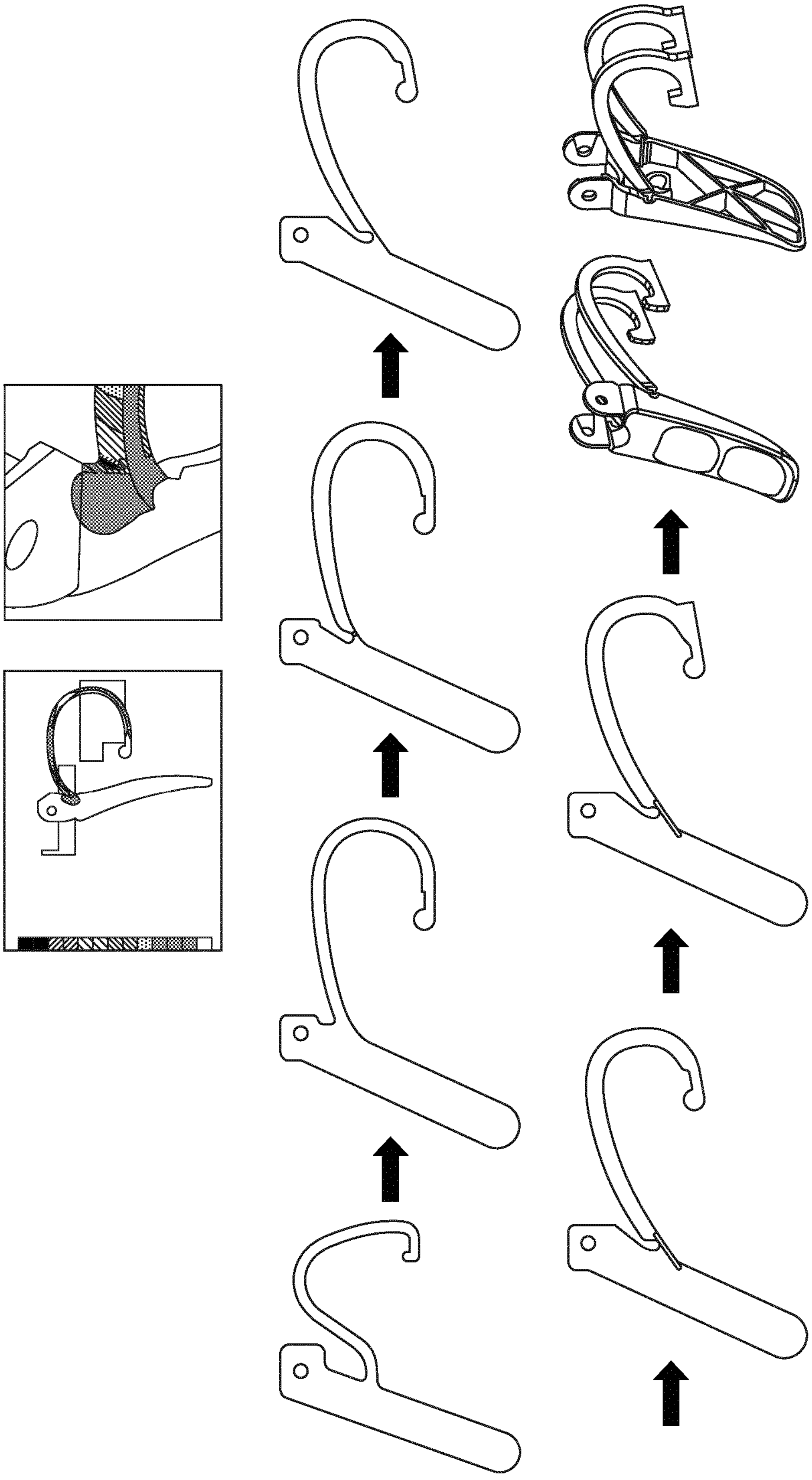
Figure 17:
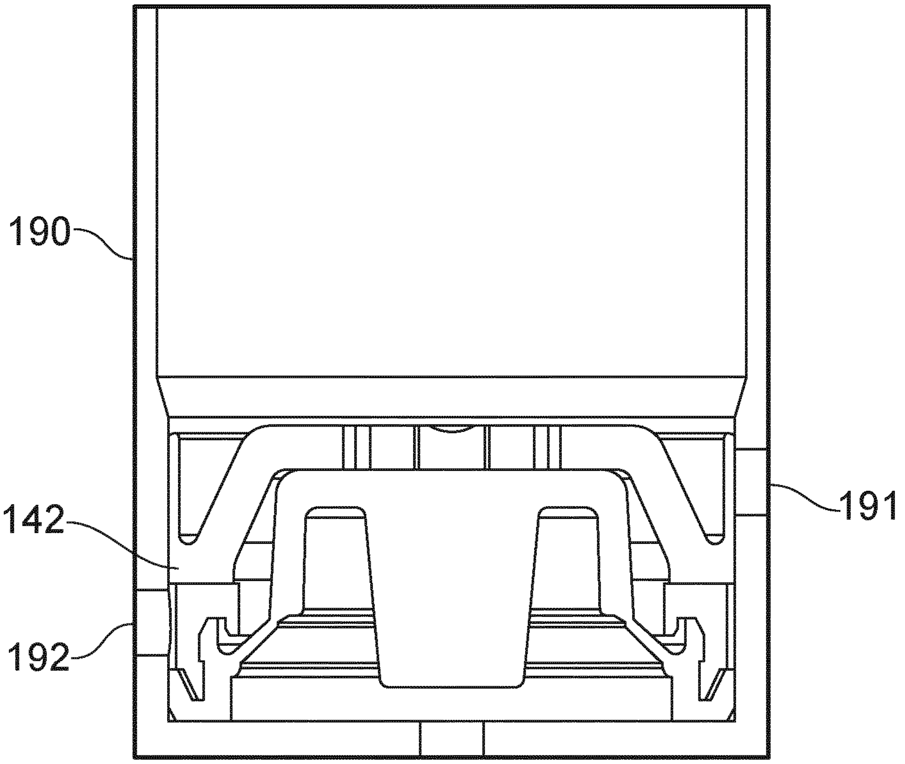
Figure 18B:
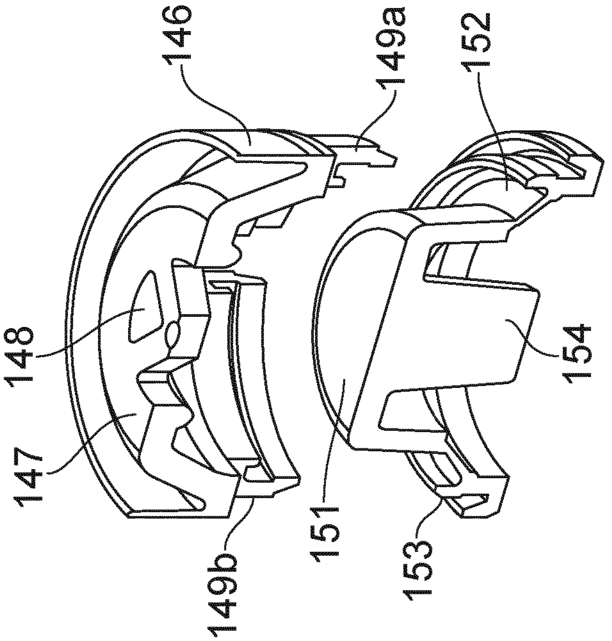
Figure 18A:
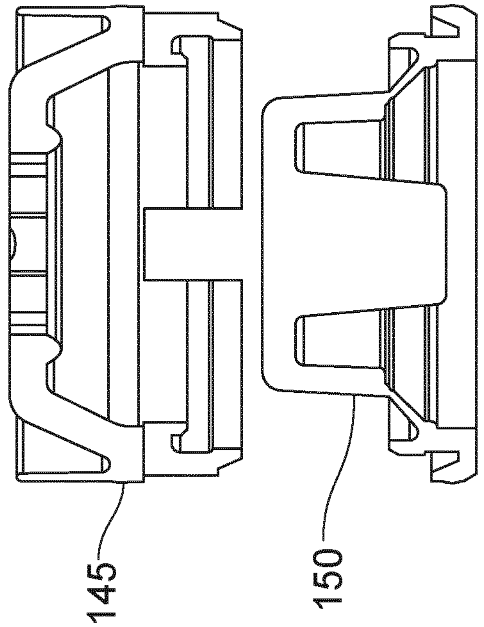

FIG. 15*a* shows the actuator of the trigger pump dispenser of FIG. 1 in a relaxed, retracted position during operation of the trigger pump dispenser;

FIG. 15*b* shows the actuator of FIG. 15*a* at 50% depression during operation of the trigger pump dispenser;

FIG. 15*c* shows the actuator of FIG. 15*a* at 100% depression during operation of the trigger pump dispenser;

FIG. 16 shows examples of different versions of spring arms of the actuator of FIG. 14;

FIG. 17 is a cross-sectional view of an inlet/outlet valve of the trigger pump dispenser of FIG. 1;

FIG. 18*a* is a cross-sectional view of an upper part and a lower part of the inlet/outlet valve of FIG. 17;

FIG. 18*b* is a perspective cross-sectional view of the upper part and the lower part of FIG. 18*a;*

Figure 19A:
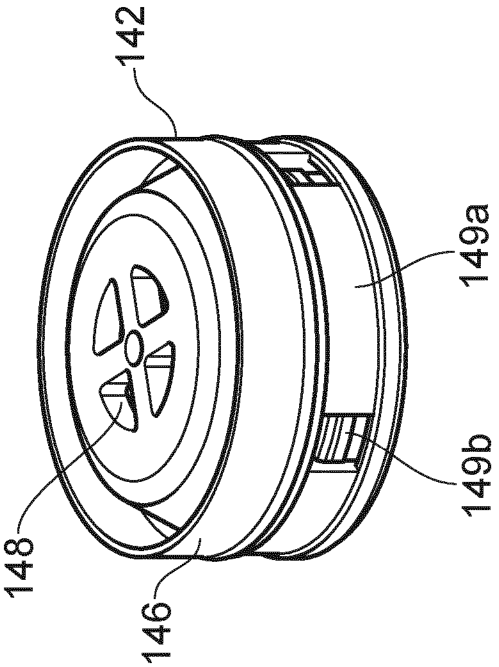
Figure 19C:
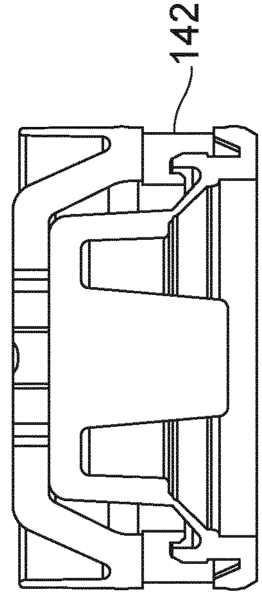
Figure 19B:
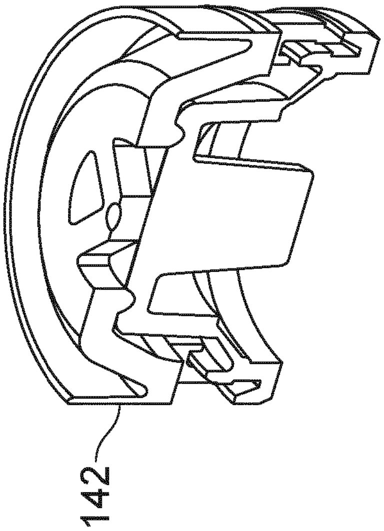

FIG. 19*a* is a perspective view of the inlet/outlet valve of FIG. 17;

FIG. 19*b* is a perspective cross-sectional view of the inlet/outlet valve of FIG. 19*a;*

FIG. 19*c* is a side cross-sectional view of the inlet/oulet valve of FIG. 19*a;*

Figure 20:
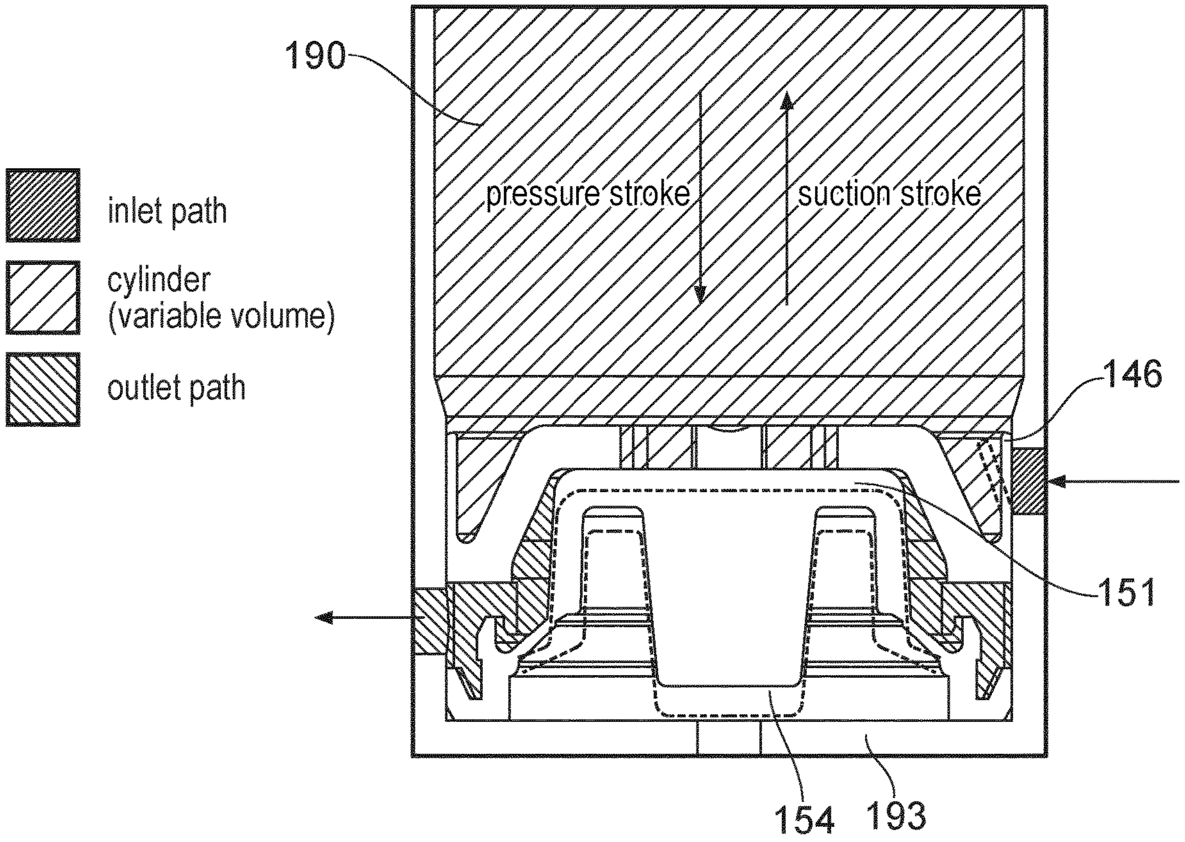
Figure 21:
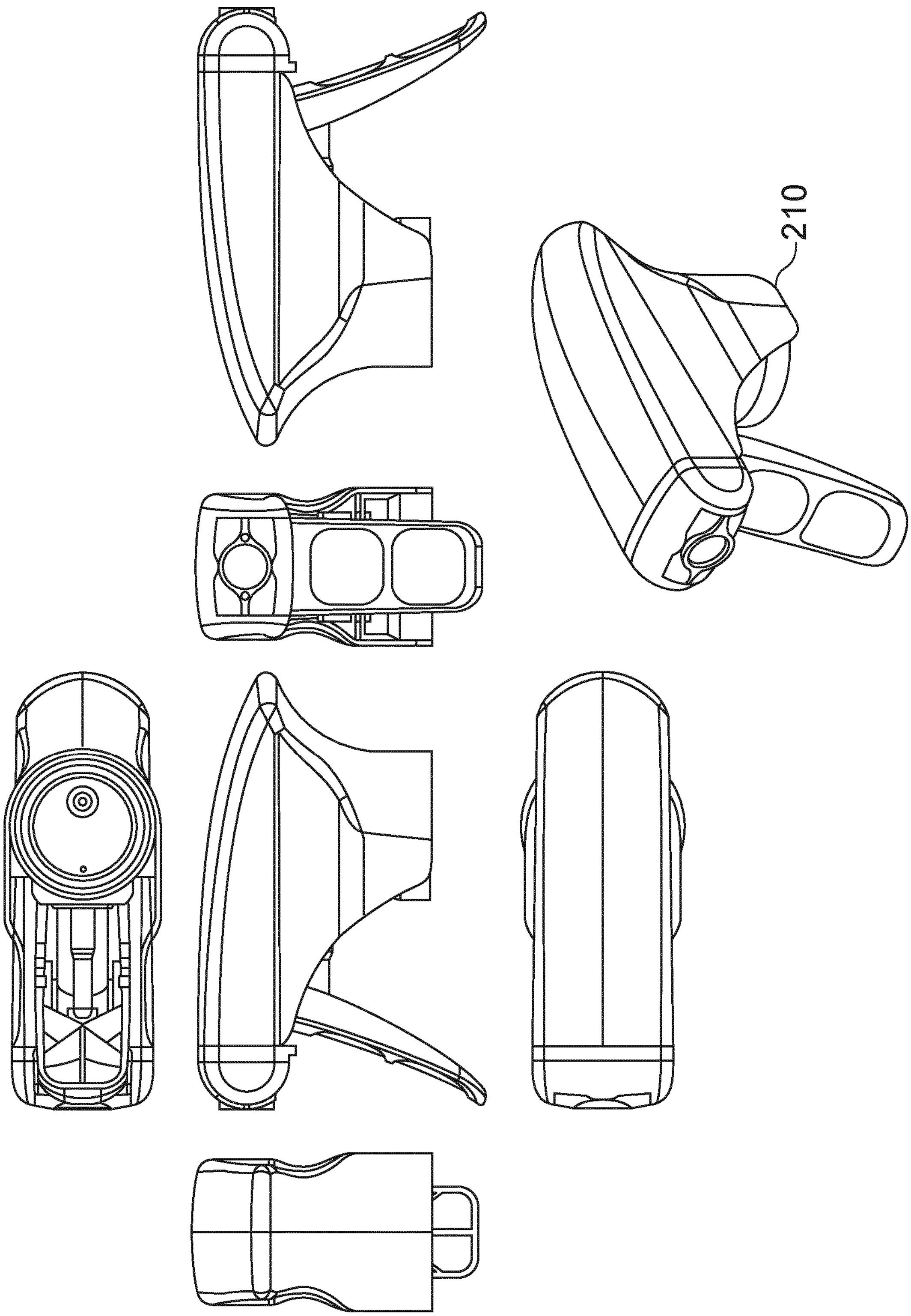
Figure 22:
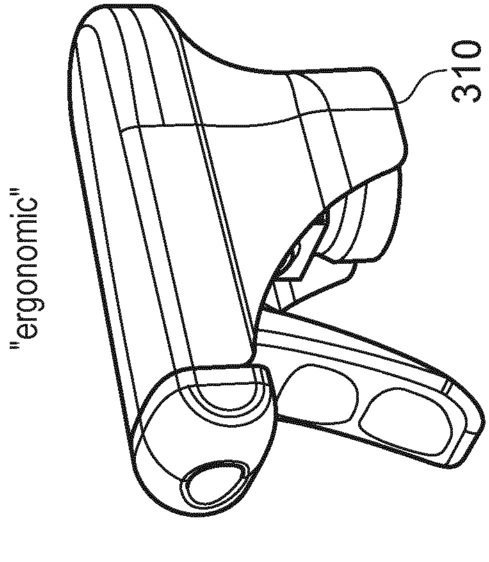
Figure 23:
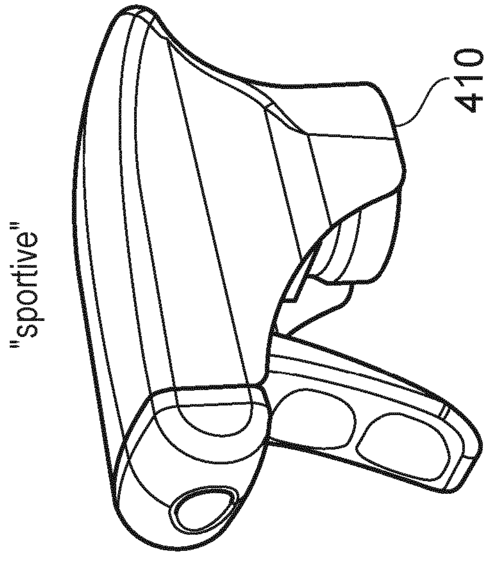
Figure 24:
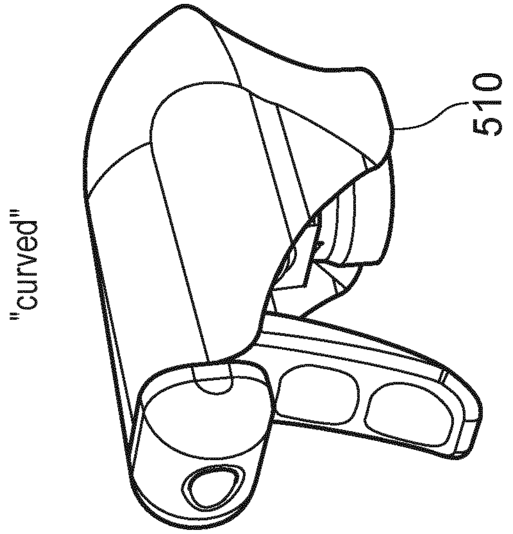

FIG. 20 is a side cross-sectional view of an inlet path, an outlet path, and a variable volume cylinder chamber of the trigger pump dispenser of FIG. 1;

FIG. 21 shows various views of a trigger pump dispenser according to a further aspect of the present disclosure;

FIG. 22 shows a perspective view of a trigger pump dispenser according to a further aspect of the present disclosure;

FIG. 23 shows a perspective view of a trigger pump dispenser according to a further aspect of the present disclosure; and FIG. 24 shows a perspective view of a trigger pump dispenser according to a further aspect of the present disclosure.

Figure 4:
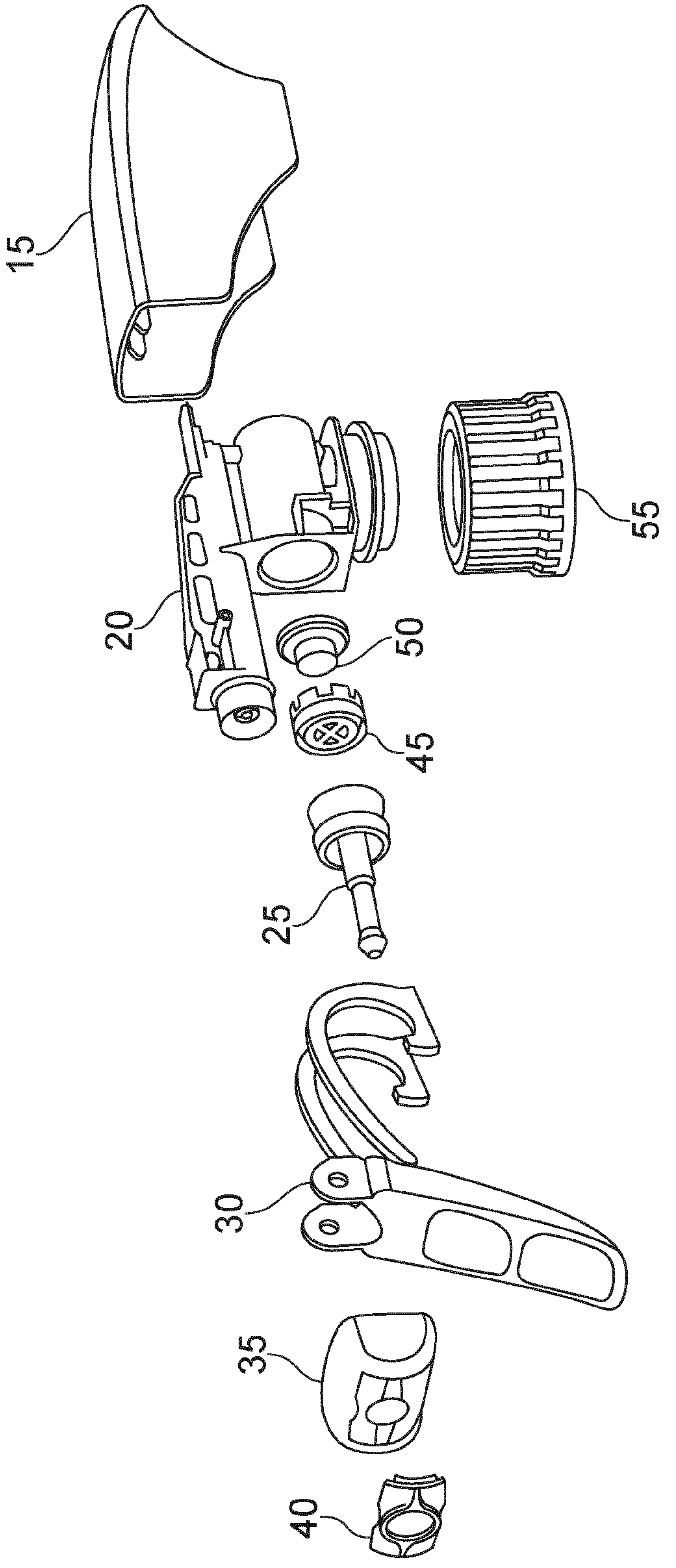
FIG. 4 is an exploded view showing the components of the trigger pump dispenser of FIG. 1.
Figure 5:
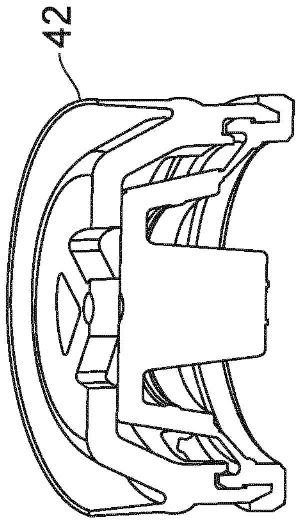
FIG. 5 is a cross-sectional view of a valve of the trigger pump dispenser of FIG. 1.
Figure 7:
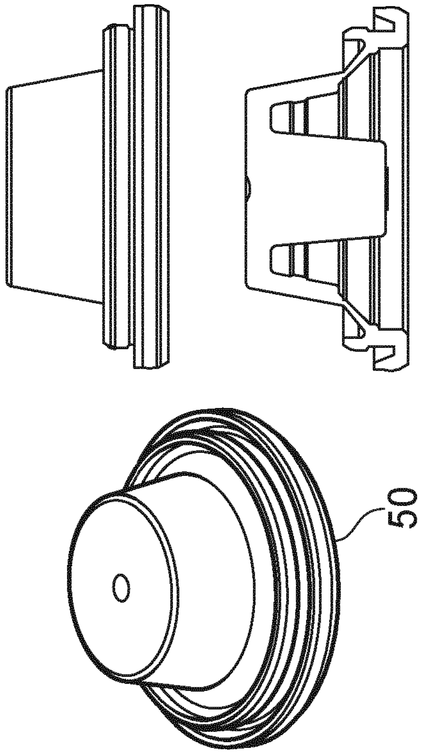
FIG. 7 shows various views of a valve lower part of the valve of FIG. 5.
Figure 6:
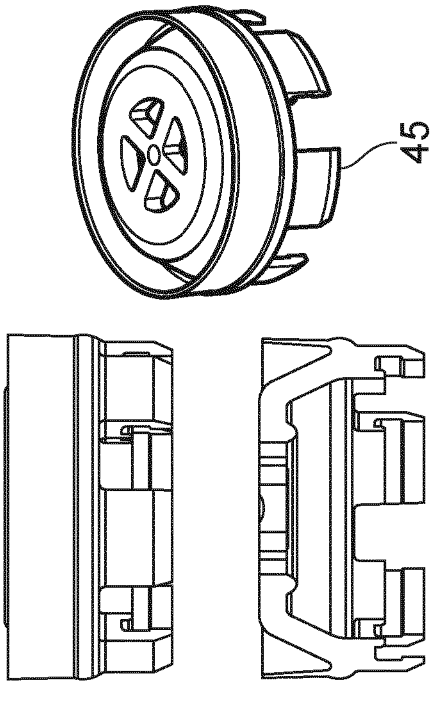
FIG. 6 shows various views of a valve upper part of the valve of FIG. 5.
Figure 8:
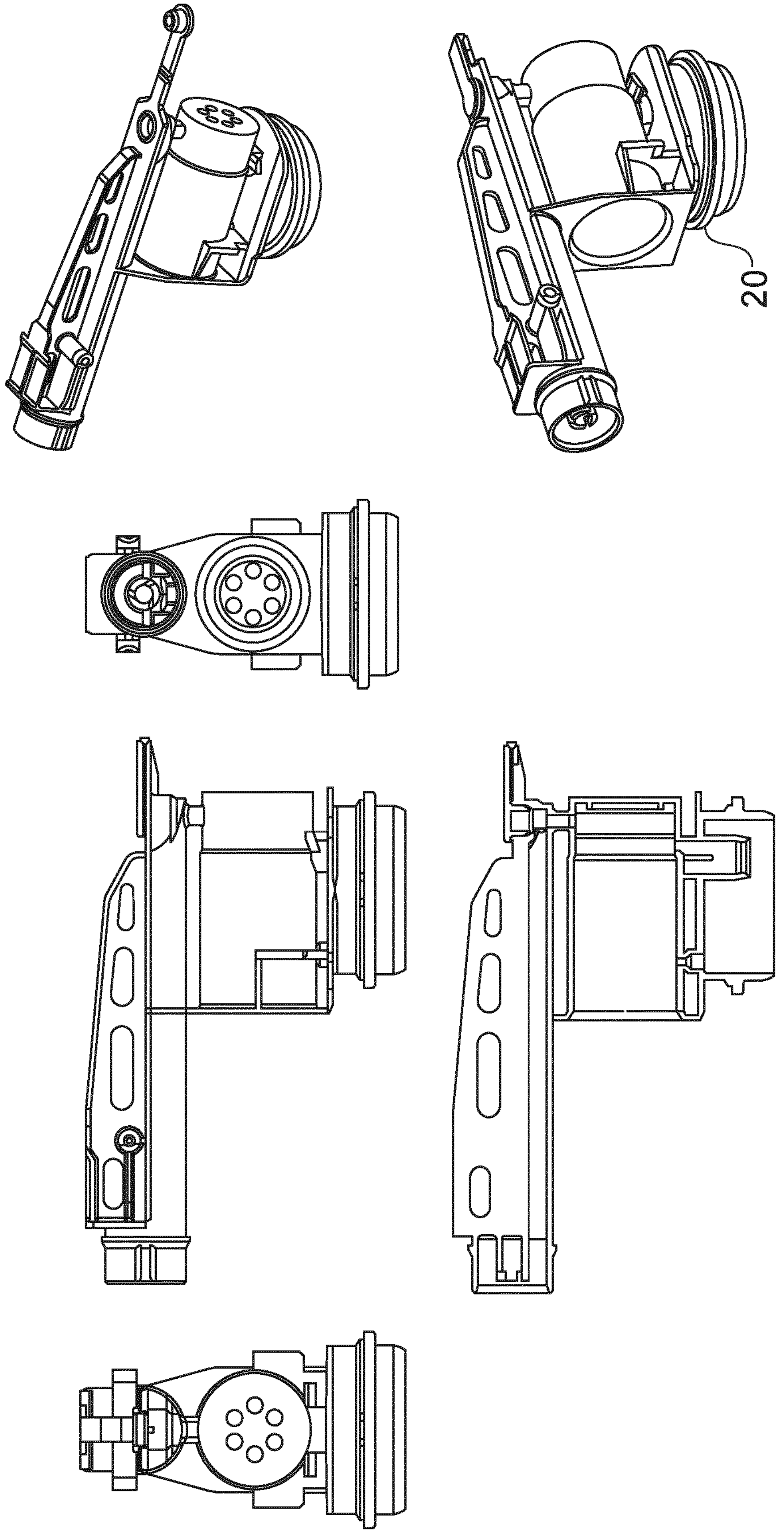
FIG. 8 shows various views of a body of the trigger pump dispenser of FIG. 1.
Figure 9:
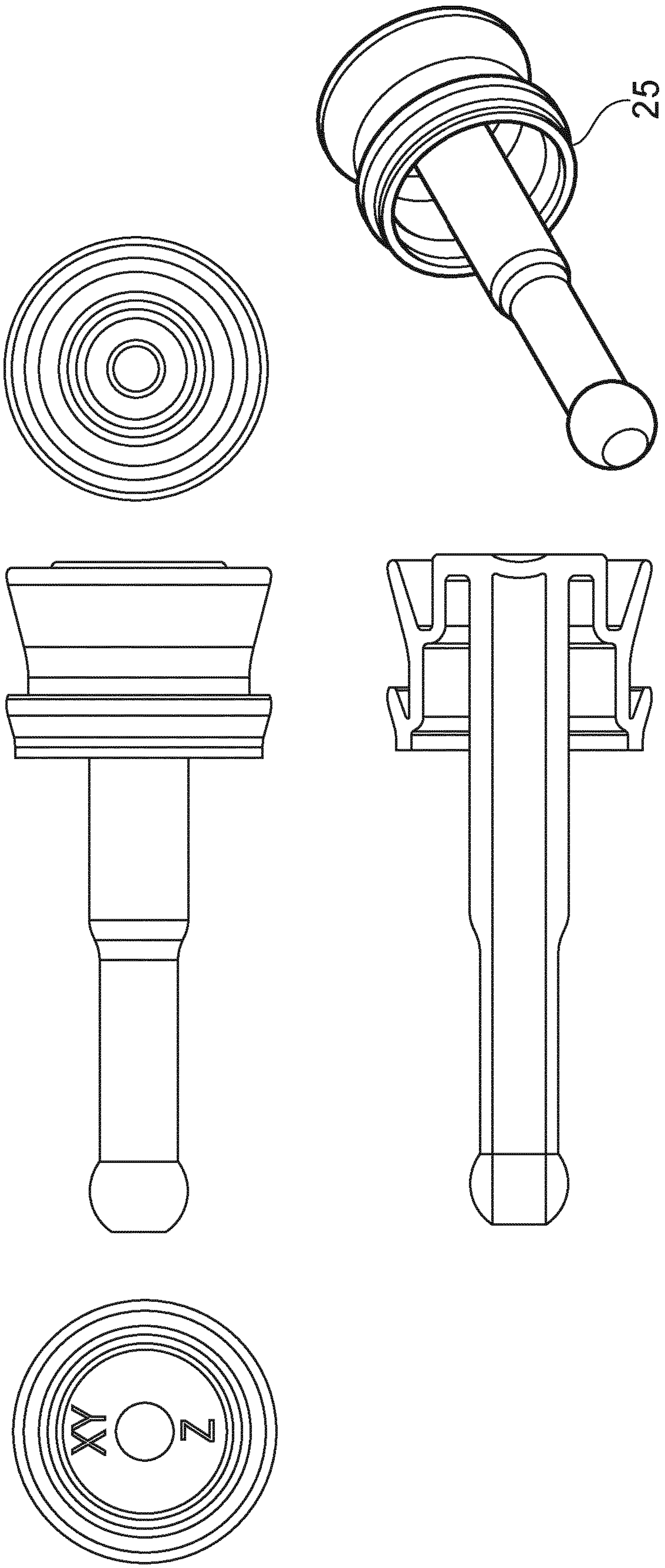
FIG. 9 shows various views of a piston of the trigger pump dispenser of FIG. 1.
Figure 10:
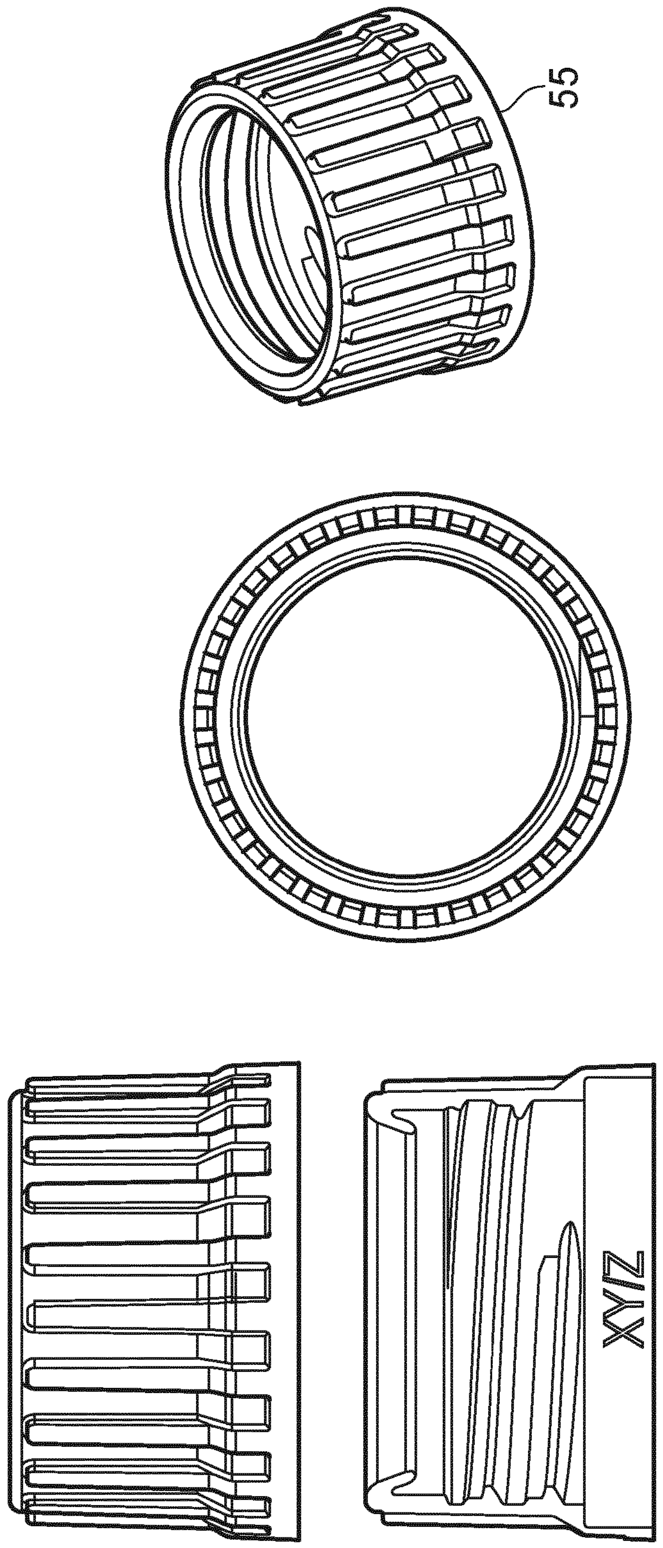
FIG. 10 shows various views of a screw-on closure of the trigger pump dispenser of FIG. 1.
Figure 11:
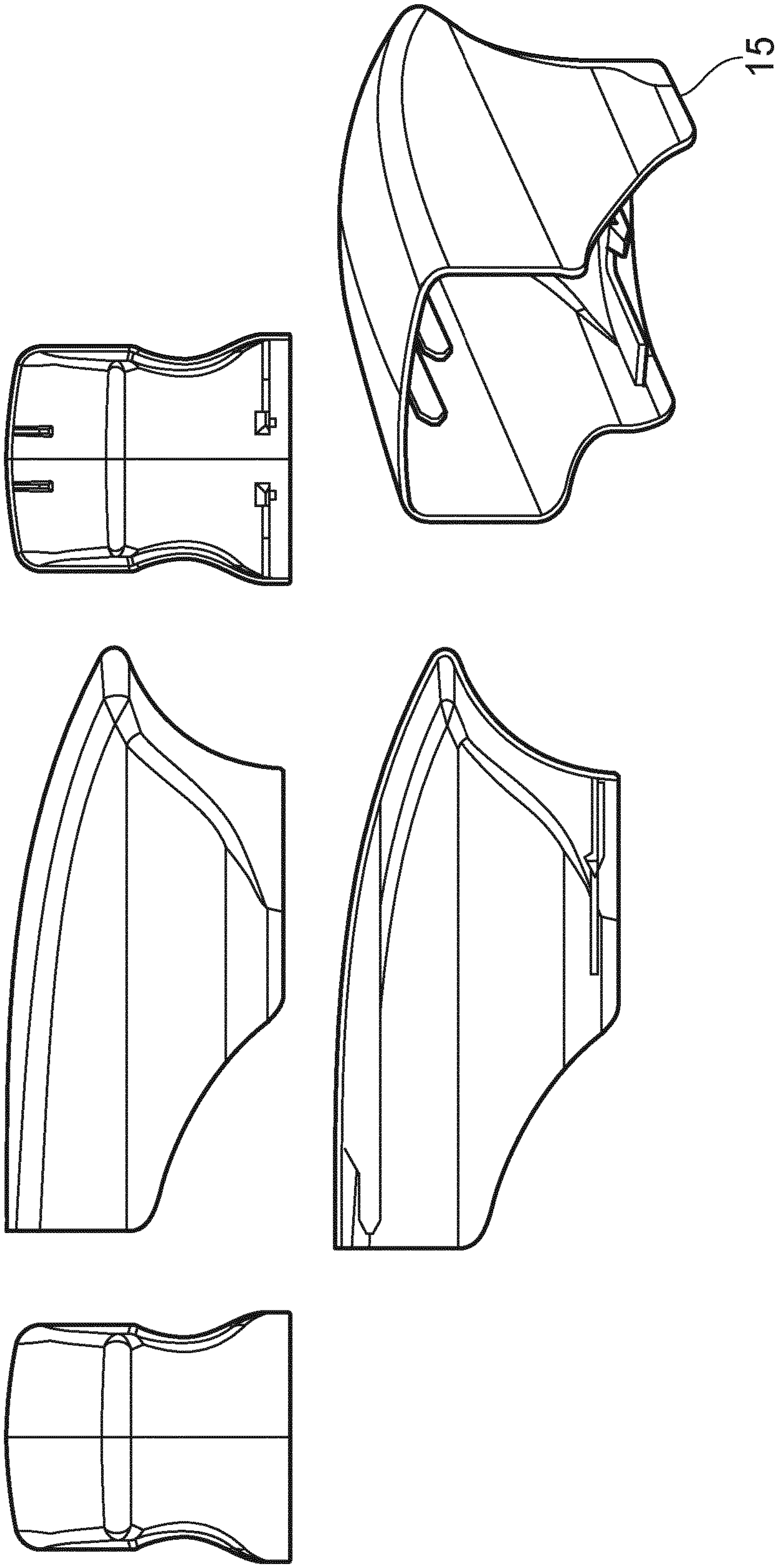
FIG. 11 shows various views of a shroud of the trigger pump dispenser of FIG. 1.
Figure 12:
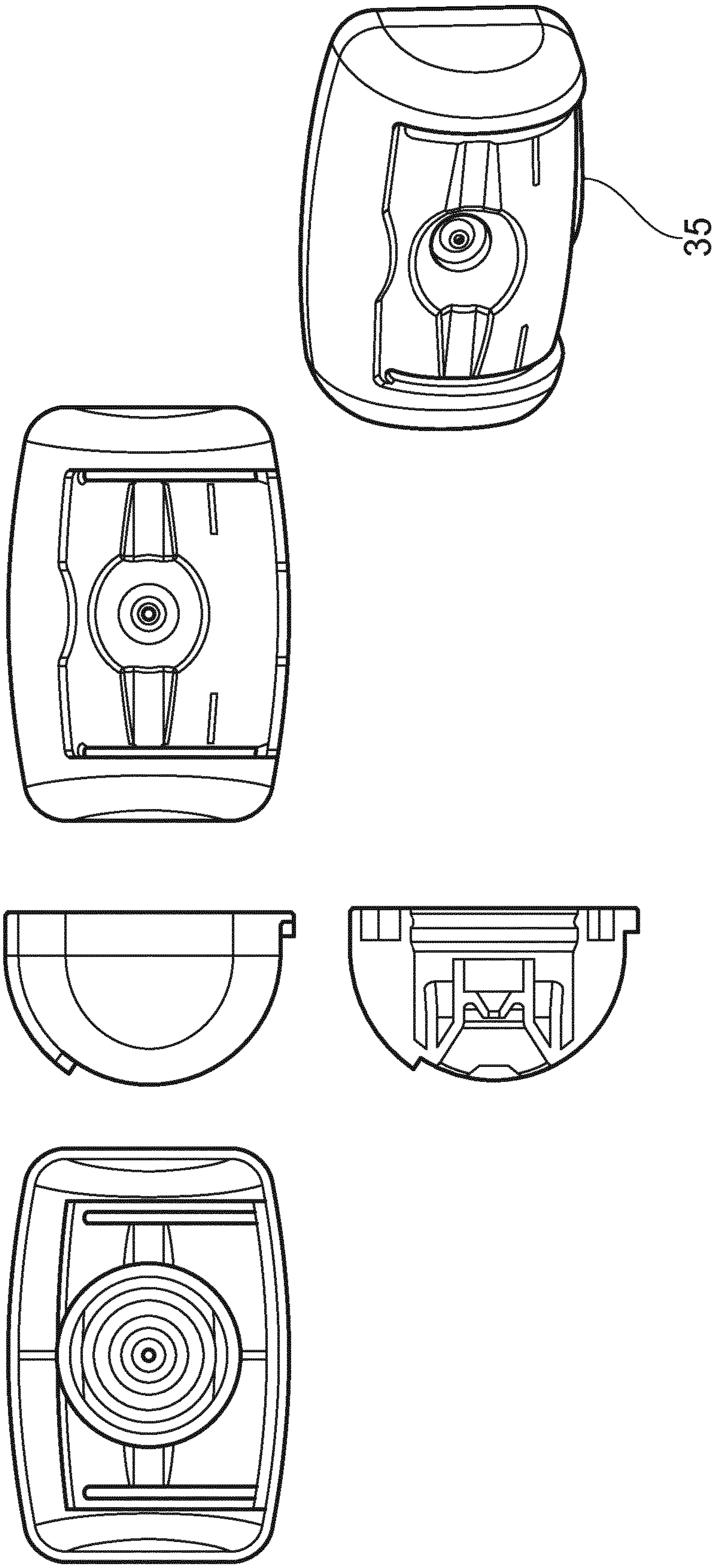
FIG. 12 shows various views of a nozzle of the trigger pump dispenser of FIG. 1.
Figure 13:
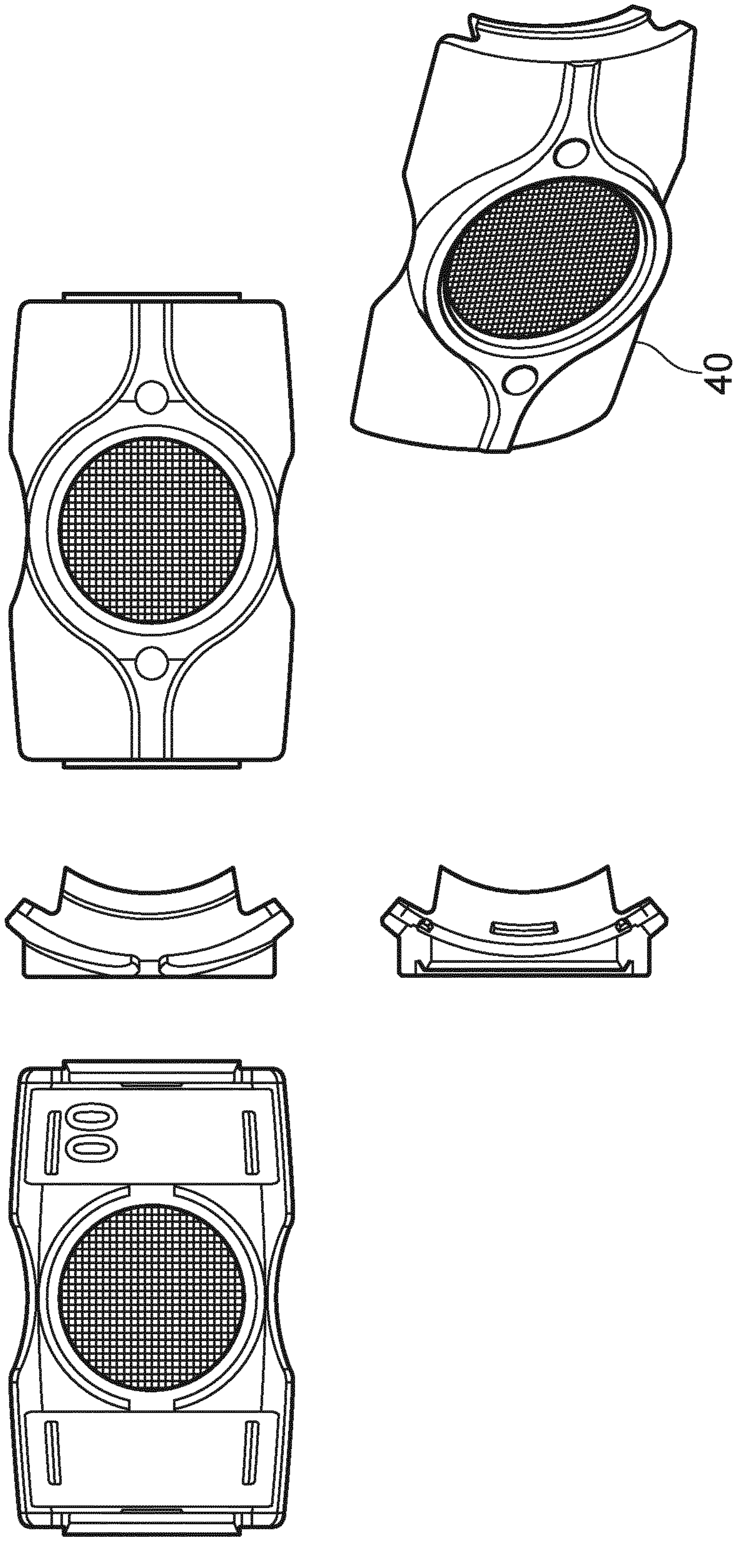
FIG. 13 shows various views of a visor of the trigger pump dispenser of FIG. 1.

Referring first to FIGS. 1 to 4 there is show a trigger pump dispenser 10. FIG. 4 is an exploded view showing the components of the dispenser: shroud 15; body 20; piston 25; actuator 30; nozzle 35; visor 40; a valve 42 comprising a valve (upper part) 45 and a valve (lower part) 50; screw-on closure 55.

FIGS. 5 to 14 show the components in further detail.

In FIG. 14 the actuator 30 is show. The actuator 30 comprises a trigger 60 and towards one end of the trigger two spaced spring arms 65*a*, 65*b* extend rearwardly. Each spring arm 65*a*, 65*b* is generally J-shape and is connected at one end via a hinged point 70. At the other end of each arm they include a flat 75 and a terminal hook/wedge 80. The top of the trigger is provided with a pair of lugs 85 each having a hole 86 for engaging corresponding pins 21 on the body 20. The trigger can rotate relative to the body.

FIGS. 15*a*-15*c* illustrate operation of the actuator 30.

FIG. 15*a* shows the actuator 30 attached to the body (via the lugs 85 and pins 21) and in a relaxed, retracted position. The spring arm flats 75 rest on a a horizontal flange 22 formed on the body and the spring hooks 80 engage behind a vertical flange 23, which constrains the spring arms.

In use the trigger 60 is pulled against the bias provided by the spring arms. As the trigger is progressively moved the arms 65*a*, 65*b* bend/deform and also hinge (downwards as shown in the drawings) with respect to the trigger. This arrangement has been found to generate more power.

FIG. 16 shows examples of different versions of the spring arms.

FIGS. 17 to 20 illustrate the inlet/outlet valve 142 and provide for a functional description of the precompression valve functionality.

FIG. 17 shows the valve 142 engaged in the pump chamber 190 of the dispenser body.

The chamber 190 includes an inlet opening 191 providing an inlet path and an outlet opening 192 providing an outlet path.

The valve 142 comprises an upper part 145 and a lower part 150. FIGS. 18*a* and 18*b* show the two parts separated and FIGS. 19*a-c* show the parts snap fitted together.

The upper part 145 comprises an annular sealing lip 146 and radially within the lip is a frusto-conical member 147 that includes central flow apertures 148. Beneath the member 147 are spaced arcuate clip sections 149*a* with apertures 149*b* formed therebetween.

The lower part 150 comprises a frustoconical central seal 151 carried on an inclined annulus 152. The annulus 152 connects to a peripheral attachment ring 153 to which the upper part clip sections 149*a* connect to secure the upper and lower parts together. A frustoconical stop 154 depends from the underside of the seal 151.

During the suction stroke, the piston (here not shown) is moved away from the valve 142, so that a vacuum builds up in the cylindrical pump chamber 190. Due to the negative pressure, the lip 146 of the inlet valve collapses (shown in dotted lines) and opens the inlet opening 191.

The liquid can now enter the cylinder chamber 190 via the inlet path.

During the pressure stroke, the piston moves in the direction of the valve 142 and thus builds up excess pressure in the system. The sealing lip 146 of the inlet valve is pressed against the outer wall of the cylinder and seals the inlet opening 191.

When a certain pressure level is exceeded, the outlet valve seal 151 snaps backwards (shown in dotted lines in FIG. 20), which creates a free passage between the outer valve part and the inner valve part. This provides the precompression functionality. The pressure level for switching is defined by the material of the valve inner part and the design of the conical connection between the outer jacket and the inner sealing element. The opening distance is determined by the length of the stop 154 as it abuts against the rear wall 193 of the chamber 190.

The gap created by the valve movement enables the liquid to flow from the cylinder space into the outlet channel.

If the system pressure drops below a certain level, the outlet valve seal snaps back into its original position and seals the outer part of the valve so that the connection from the cylinder chamber to the outlet side is closed again.

One advantage of this valve concept is that it is an independent pre-compression valve element with which can, for example, be used to constructively convert existing non-pre-compression pumps to pre-compression.

FIG. 21 shows a bayonet fixing version of a trigger pump dispenser 210 formed in accordance with the present invention. The dispenser is similar to the dispenser of FIGS. 1 to 15, except that instead of a screw threaded collar a bayonet-style attachment means is provided for securing the dispenser to a container.

FIGS. 22 to 24 illustrate three different exterior designs of dispensers 310, 410, 510 formed in accordance with the present invention.

There is no intent to limit to the particular form disclosed.

Although illustrative embodiments of the invention have been disclosed in detail herein, it is understood that the invention is not limited to the precise embodiments shown and that various changes and modifications can be effected therein by one skilled in the art without departing from the scope of the invention.

The invention claimed is:

1. A trigger pump dispenser comprising:

a body; an outlet nozzle; a pump chamber comprising a rear wall and an outer wall; a piston for defining a variable volume in the pump chamber and movable between a retracted position of larger chamber volume and an inserted position of lesser chamber volume; a trigger coupled with the piston and movable from a starting position at which the piston is in the retracted position and a depressed position at which the piston is in the inserted position; biasing means for biasing the trigger towards the starting position, the pump chamber comprises an inlet port and an outlet port, the pump comprises a valve adapted to close the inlet port when liquid to be dispensed is in the pump chamber and the piston is moved from the retracted position to the inserted position as the pump chamber decreases in volume, the valve is adapted to open the inlet port when the liquid to be dispensed is drawn into the pump chamber through the inlet port as the pump chamber volume increases when the piston is moved from the inserted position to the retracted position, the valve is adapted to open the outlet port when the pump chamber decreases in volume as the liquid therein is dispensed through the outlet port and adapted to close the outlet port when the pump chamber increases in volume, the valve comprises a precompression valve operable to allow the liquid through the outlet port only after a predetermined elevated pressure is established in the pump chamber, wherein the inlet port is formed in the pump chamber outer wall, wherein the outer wall extends away from the rear wall, and wherein the valve comprises a valve member, the valve member comprising an outer valve part and an inner valve part, the valve parts being formed separately and being connectable together, one of the valve parts provides an inlet valve function and the other of the valve parts provides an outlet valve function.

2. The trigger pump dispenser of claim 1, wherein the outlet port is formed in the pump chamber outer wall.

3. The trigger pump dispenser of claim 2, wherein the outlet port is closer to the rear wall than the inlet port.

4. The trigger pump dispenser of claim 1, wherein during a suction stroke the piston is configured to move away from the valve, so that a vacuum builds up in the pump chamber and due to negative pressure a sealing lip of the valve collapses and opens the inlet, the liquid can now enter the pump chamber via the inlet, wherein during the pressure stroke the piston is configured to move in a direction of the valve and thus builds up excess pressure in the trigger pump dispenser, the sealing lip of the valve is pressed against the outer wall of the pump chamber and seals the inlet, and wherein when the predetermined elevated pressure is reached, the valve is configured to snap backwards, which creates a free passage between the outer valve part and the inner valve part.

5. The trigger pump dispenser of claim 4, wherein the predetermined elevated pressure is defined by a material of the inner valve part.

6. The trigger pump dispenser of claim 4, wherein the outer valve part and the inner valve part forms a connection and wherein pressure in the pump chamber drops below the predetermined elevated pressure, the outlet valve is configured to snap back into the starting position and seal the outer part of the valve so that said connection from the outer valve part and the inner valve part is closed again.

7. The trigger pump dispenser of claim 1, wherein a gap created by the valve movement enables the liquid to flow from the pump chamber through the outlet port.

8. The trigger pump dispenser of claim 1, further comprising a central stop, in which the valve opening distance is determined by the length of the central stop.

9. The trigger pump dispenser of claim 1, wherein the trigger and the biasing means are formed in a same component, and in which the biasing means comprises a pair of mutually spaced curved spring arms.

10. The trigger pump dispenser of claim 9, wherein the arms are joined to the trigger at hinge points, whereby the arms can hinge relative to the trigger in use.

11. The trigger pump dispenser of claim 9, wherein the trigger and the spring arms are formed together as a single piece.

12. The trigger pump dispenser of claim 9, wherein the arms are J-shape.

13. The trigger pump dispenser of claim 9, wherein the arms extend parallel to each other.

14. The trigger pump dispenser of claim 9, wherein the spring arms are straight along a vertical plane, and in which the spring arms are curved in a horizontal plane.

15. The trigger pump dispenser of claim 9, wherein the end of the arms opposite the trigger includes a flat, and wherein the end of the arms opposite the trigger further includes a hook or a wedge.

16. The trigger pump dispenser of claim 9, wherein the arms extend from the trigger at one end and at the other end they are free in at least one degree of freedom.

17. The trigger pump dispenser of claim 9, wherein the trigger is configured to pull against the bias provided by the spring arms, and in which as the trigger is progressively moved the arms bend or deform and also hinge with respect to the trigger.

18. The trigger pump dispenser of claim 1, wherein the rear wall is flat.

19. The trigger pump dispenser of claim 1, wherein the outer wall is a curved lateral wall, and wherein the inlet port is formed in the curved lateral wall.

20. A trigger pump dispenser comprising:

a body; an outlet nozzle; a pump chamber comprising a rear wall and an outer wall; a piston for defining a variable volume in the pump chamber and movable between a retracted position of larger chamber volume and an inserted position of lesser chamber volume; a trigger coupled with the piston and movable from a starting position at which the piston is in the retracted position and a depressed position at which the piston is in the inserted position; biasing means for biasing the trigger towards the starting position, the pump chamber comprises an inlet port and an outlet port, the pump comprises a valve adapted to close the inlet port when liquid to be dispensed is in the pump chamber and the piston is moved from the retracted position to the inserted position as the pump chamber decreases in volume, the valve is adapted to open the inlet port when the liquid to be dispensed is drawn into the pump chamber through the inlet port as the pump chamber volume increases when the piston is moved from the inserted position to the retracted position, the valve is adapted to open the outlet port when the pump chamber decreases in volume as the liquid therein is dispensed through the outlet port and adapted to close the outlet port when the pump chamber increases in volume, the valve comprises a precompression valve operable to allow the liquid through the outlet port only after a predetermined elevated pressure is established in the pump chamber, wherein the inlet port is formed in the pump chamber outer wall, wherein an inlet path extending from the inlet port is perpendicular to a central axis of the pump chamber, and wherein the valve comprises a valve member, the valve member comprising an outer valve part and an inner valve part, the valve parts being formed separately and being connectable together, one of the valve parts provides an inlet valve function and the other of the valve parts provides an outlet valve function.

* * * * *